(12) United States Patent
Glanville et al.

(10) Patent No.: US 8,844,471 B2
(45) Date of Patent: Sep. 30, 2014

(54) INTEGRATED CONTACT CONDENSING WATER HEATER

(75) Inventors: Paul Eric Glanville, Chicago, IL (US); Mark Jacob Khinkis, Morton Grove, IL (US); Aleksandr Pavlovich Kozlov, Buffalo Grove, IL (US); David Charles Kalensky, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 825 days.

(21) Appl. No.: 12/814,823

(22) Filed: Jun. 14, 2010

(65) Prior Publication Data

US 2011/0303164 A1    Dec. 15, 2011

(51) Int. Cl.
*F24H 1/18* (2006.01)
*F24H 8/00* (2006.01)
*F24H 1/20* (2006.01)

(52) U.S. Cl.
CPC ............ *F24H 1/206* (2013.01); *Y02B 30/102* (2013.01); *F24H 8/003* (2013.01); *Y02B 30/104* (2013.01); *F24H 8/00* (2013.01)
USPC ........ 122/17.1; 122/17.2; 122/18.1; 122/18.2; 122/18.3; 122/18.31; 122/29; 122/208; 237/56; 237/57; 237/59; 237/8 R; 237/19

(58) Field of Classification Search
USPC ............ 122/17.2, 18.1, 18.2, 18.3, 18.31, 29, 122/17.1, 20 B
See application file for complete search history.

(56) References Cited

U.S. PATENT DOCUMENTS

| | | | |
|---|---|---|---|
| 4,195,485 A * | 4/1980 | Brinkerhoff | 60/649 |
| 4,266,513 A * | 5/1981 | Schaus | 122/155.2 |
| 4,401,058 A * | 8/1983 | Charrier et al. | 122/18.4 |
| 4,846,150 A * | 7/1989 | Maton | 122/18.2 |
| 4,909,191 A * | 3/1990 | Le Mer | 122/18.4 |
| 5,197,415 A * | 3/1993 | Stretch et al. | 122/14.22 |
| 5,293,861 A | 3/1994 | Mandeville et al. | |
| 5,401,142 A * | 3/1995 | Yumoto | 417/132 |
| 5,699,756 A * | 12/1997 | Ross et al. | 122/18.3 |
| 5,765,546 A | 6/1998 | Mandeville et al. | |
| 5,967,137 A * | 10/1999 | Guillet et al. | 126/360.1 |

FOREIGN PATENT DOCUMENTS

CA    2136781    5/1996

OTHER PUBLICATIONS

Hunt, Marshall, "Super Efficient Gas Water Heating Appliance Initiative", California Energy Commission, May 2008.
Sofame Technologies Brochure, www.sofame.com/Percomax_eng.htm.
Sofame Technologies Brochure, www.sofame.com/Ultrahighefficiency_eng.htm.
Guillet, Remi et al., "Wet Way Combustion", Elsevier, (2000) pp. 76-81.

* cited by examiner

*Primary Examiner* — Kang Hu
*Assistant Examiner* — Nathaniel Herzfeld
(74) *Attorney, Agent, or Firm* — Pauley Petersen & Erickson

(57) ABSTRACT

An apparatus for heating water having three vertically aligned water heating process sections. The upper section includes an annular water storage tank disposed around a combustion chamber having a downward firing burner. The intermediate section, disposed vertically below the upper section receives flue gas from the combustion chamber, which flue gas is cooled and dehumidified, producing a hot condensate which collects in a passive condensate flow control device disposed proximate the bottom of the intermediate section. The lower section, disposed vertically below the intermediate and separated therefrom by the passive condensate flow control device receives hot condensate from the flow control device, which is used to preheat and humidify air, such as room air, which is then recycled to the combustion process of the upper section for use as combustion air. This passive condensate flow control device uses gravity to inject condensate, thereby facilitating a system design that only requires a single condensate pump.

19 Claims, 3 Drawing Sheets

US 8,844,471 B2

INTEGRATED CONTACT CONDENSING WATER HEATER

BACKGROUND OF THE INVENTION

1. Field of the Invention

This invention relates to an apparatus for heating water. More particularly, this invention relates to condensing water heating systems. In one aspect, this invention relates to liquid- or gaseous-fuel fired condensing water heating systems. In one aspect, this invention relates to condensing gas-fired commercial or residential water heating systems which utilize heat and moisture from the flue gases generated by the combustion process to humidify and preheat the combustion air employed in the combustion process.

2. Description of Related Art

Conventional condensing water heaters, which have an extended flue gas-to-water surface area within the storage tank (or the reverse in the case of condensing tankless water heaters), are limited by the heat sink temperature, i.e. the stored or incoming water, and the dew point of the flue gases. Although truly condensing devices, these water heaters typically advertise an "up-to" efficiency rating, acknowledging that, for example, storage-based water heaters may only reduce flue gas temperature to that of some portion of the storage tank. When such a storage-based water heater fires in standby, whereby the thermostat dead band has been surpassed (i.e. the tank is warm or hot), the flue gases may not even condense depending on the thermostat set point. It should be noted that the estimated efficiency is without regard to the system state due to a static heat sink. That is, this is not an "up-to" efficiency due to the flue gases being condensed effectively by ambient conditions rather than the water tank itself.

Currently, there are a number of condensing tankless and storage-based water heaters available on the market for both commercial and residential applications. These units claim "up-to" 99% thermal efficiency; however, this is a state dependent efficiency, and for storage systems, it requires that the stored water temperature be non-uniform, that is, cold near the flue gas exit. The cost of condensing water heaters, both commercial and residential, is dependent upon its primary technology, the glass-lined flue/heat exchanger. The greater the heat exchanger surface area, the greater the efficiency, performance, and cost. This is particularly problematic for condensing versus non-condensing storage-based water heaters, as the heat sink is not as consistently dynamic as tankless water heaters.

SUMMARY OF THE INVENTION

It is one object of this invention to provide a gas-fired water heater having increased thermal efficiency compared with conventional water heaters.

It is another object of this invention to provide a gas-fired water heater with consistent performance not limited to the state of the combined heat sink.

These and other objects of this invention are addressed by an apparatus for heating water comprising a first section having an annular hot water storage tank disposed around a vertically oriented combustion chamber, which vertically oriented combustion chamber, having a combustion end and a flue gas exhaust end, is in direct heat exchange communication with the annular hot water storage tank. A burner is provided at the combustion end of the combustion chamber, which burner is adapted to fire downward from the combustion end of the combustion chamber into the combustion chamber. The apparatus further comprises a second section disposed vertically below the first section in fluid communication with the flue gas exhaust end of the combustion chamber and having a second section flue gas exhaust. The apparatus further comprises a third section vertically disposed below the second section having an ambient air inlet, a humidified air outlet in fluid communication with the combustion end of the combustion chamber, and a condensate outlet in fluid communication with the second section. Disposed between the second section and the third section is a passive condensate flow control device having a condensate inlet side oriented toward the second section and a condensate outlet side oriented toward the third section. This passive condensate flow control device uses gravity to inject condensate, thereby facilitating a system design that only requires a single condensate pump.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
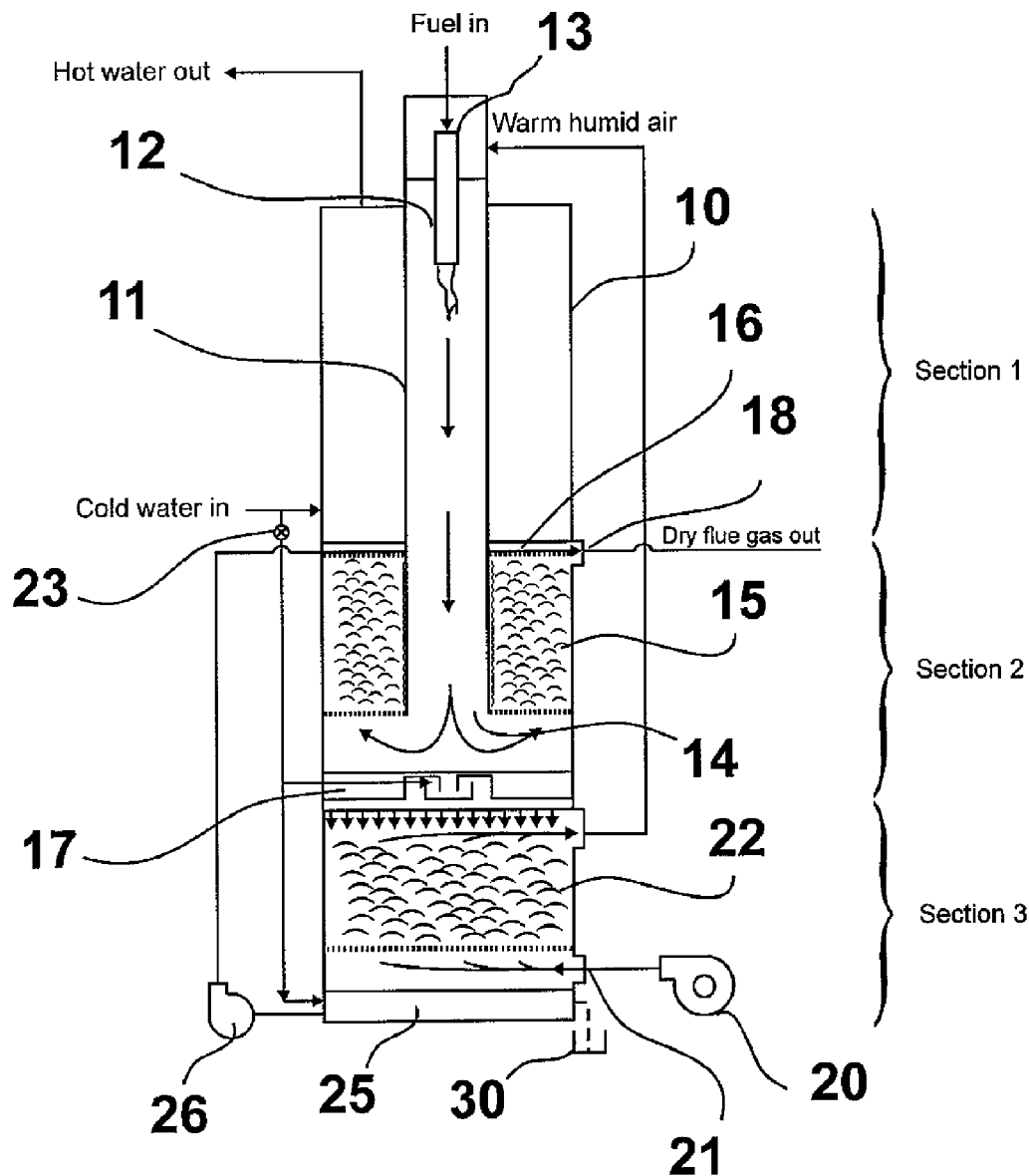
FIG. 1 is a schematic diagram of an apparatus for heating water in accordance with one embodiment of this invention.

As shown in FIG. 1, the integrated contact condensing water heater of this invention comprises three distinct, vertically aligned sections. Section 1, the upper section, is a hot water storage section; section 2, the intermediate section, is a direct contact exhaust heat and condensate recovery section; and section 3, the lower section, is a combustion air preheat and humidification section. Sections 2 and 3 function to exchange latent heat within the humid combustion products to the combustion air and, thus, keep it in the cycle. Section 2 rejects dehumidified exhaust products and warm condensate, which during steady state operation is equal to the amount replenished from Section 3. The cold condensate that is not drained or utilized is recycled to section 1.

Section 1, the upper section, comprises a hot water storage tank 10 annularly disposed around a centralized combustion chamber 11, which combustion chamber comprises a combustion end having a combustibles inlet 13, at which end the combustion of the liquid fuel, e.g. diesel or jet fuel, or gaseous fuel, e.g. natural gas or propane, used for heating water in the storage tank is carried out by a downward firing burner 12, and having a flue gas end having a flue gas outlet 14 through which the combustion products, at a temperature above the dew point of the water vapor therein, exit the combustion chamber into section 2, the intermediate section.

The flue gas entering the intermediate section is cooled to a temperature at which water vapor in the flue gas condenses. Cooling of the flue gas is accomplished, in accordance with one embodiment of this invention, by a combination of a high surface-area-to-volume packing material 15 and cold condensate recycled from section 3, the lower section, and sprayed by any suitable spray means 16 from the top of the intermediate section. Suitable packing materials include, but are not limited to plastics, ceramics, glass, glass-ceramics, and non-corrosive metals, such as aluminum. Condensate, primarily at the incoming flue gas dew point temperature, is collected at the bottom of the intermediate section by a passive condensate flow control device 17 disposed between the intermediate section and section 3, the lower section. Once through the packing material, the substantially dehumidified flue gas, cooled to a temperature in the range of about 15-30° F. above ambient conditions and at ambient humidity, is exhausted through the intermediate section flue gas outlet 18.

Figure 2:
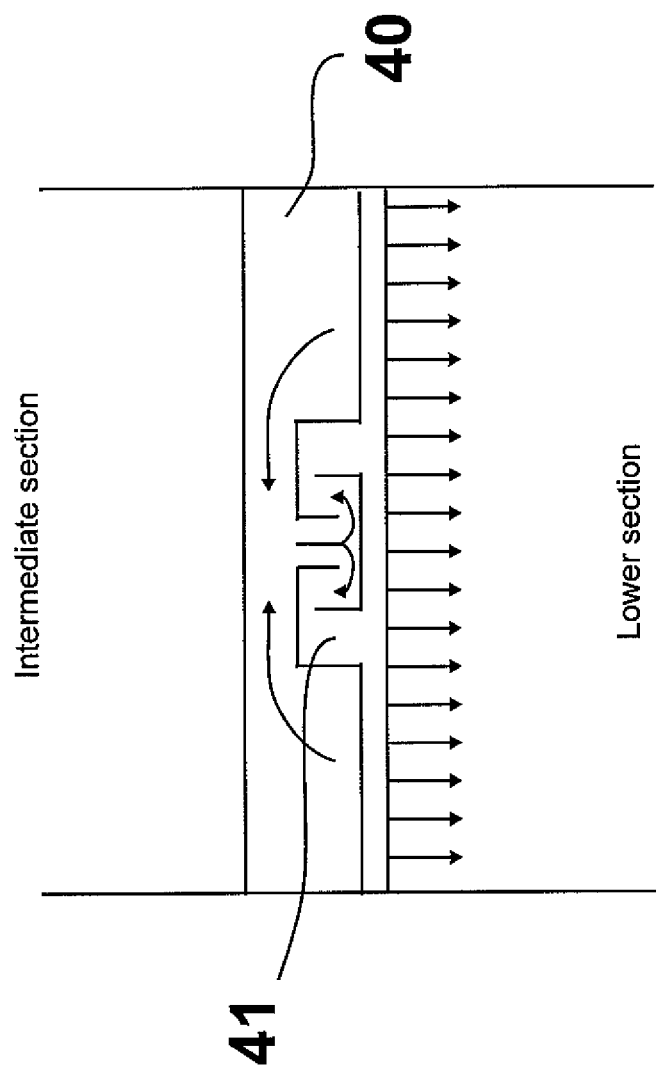
FIG. 2 is a schematic diagram of a passive flow control device suitable for use in the apparatus of this invention.

As previously stated, a passive condensate flow control device, shown in accordance with one embodiment in FIG. 2, is provided between the intermediate and lower sections of the apparatus of this invention. As used herein, the term "passive" as used in connection with a flow control device refers to a device for which no external energy source is required. In the instant case, the passive condensate flow control device is a gravity-driven device, relying entirely on gravitational forces to move the hot condensate from the intermediate section into the lower section of the apparatus of this invention. In addition, the passive condensate flow control device of this invention restricts the flow of flue gases between the intermediate and lower sections of the apparatus by means of a flooded seal and meters the condensate movement during initial startups so as to prevent humidification of combustion air prior to heating of burner 12.

In section 3, the lower section of the apparatus of this invention, air for use as combustion air in the combustion chamber is preheated and humidified. Ambient air for use as combustion air in the combustion chamber is provided by a blower 20 and is introduced through ambient air inlet 21 into the lower section containing a lower section packing material 22 which, in accordance with one embodiment of this invention, is made of plastic. Hot condensate passed by the passive condensate flow control device trickles into the lower section for preheating and humidifying the room/combustion air. The lower section packing material 22 slows the fluid flows within the lower section, thereby increasing the fluid residence times therein and, thus, increasing the heat and mass transfer as the hot condensate trickles down from the top of the lower section. Cold condensate which is not entrained in the ambient/combustion air collects in reservoir 25 of the lower section from which it is pumped by means of pump 26 back to the intermediate section. The level of cold condensate in the reservoir is maintained with a drain 30 or additional utilization.

FIG. 2 is a schematic diagram of a passive condensate flow control device in accordance therewith. As shown therein, the device comprises an annular reservoir 40. As condensate volume increases, the annular reservoir fills until the condensate reaches a given level at which point the excess condensate flows, as indicated by the arrows, into a centrally disposed reservoir 41. When the condensate level in the centrally disposed reservoir exceeds the capacity of the reservoir, the excess condensate overflows into the lower section of the apparatus of this invention as previously discussed. As will be apparent to those versed in the art, so long as the annular and centrally disposed reservoirs remain filled with condensate, no flue gases present in the intermediate section of the apparatus can pass through the passive condensate flow control device into the lower section of the apparatus. During system start-up, when the condensate reservoirs are not sufficiently filled to prevent the passage of the flue gases, a control valve 23 connected with a cold water supply is initially opened to fill the condensate reservoirs with cold water.

Figure 3:
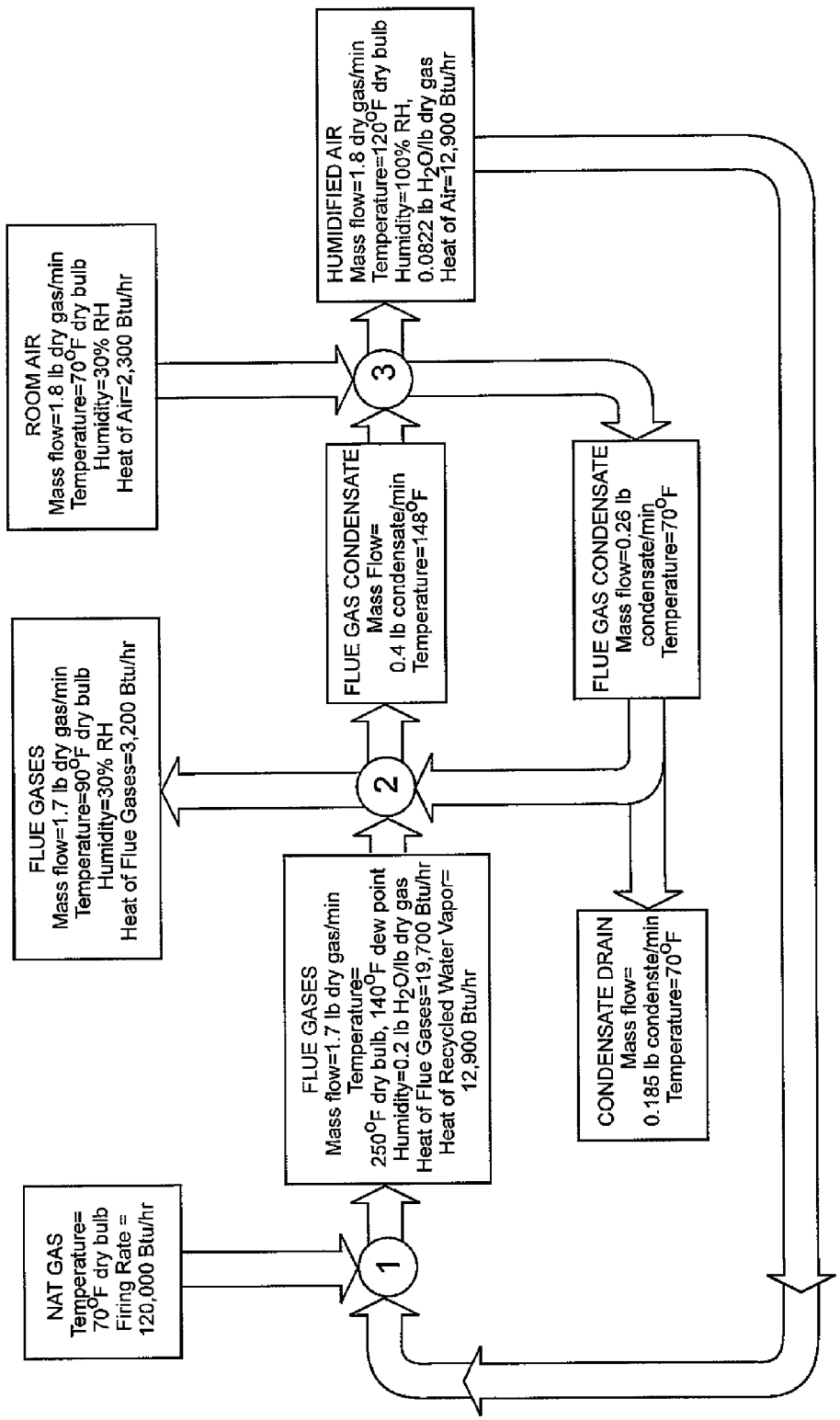
FIG. 3 is a diagrammatic representation of an exemplary estimate of the performance of the apparatus for heating water in accordance with one embodiment of this invention.

FIG. 3 is a diagram showing an exemplary estimate of the performance of an apparatus for heating water in accordance with one embodiment of this invention. While in principal, the apparatus of this invention may be sized for any demand in most residential and commercial applications, the example shown in FIG. 3 is used to illustrate efficiency gains as well as NO reductions as compared with conventional water heaters. With ambient conditions of 70° F. and 30% relative humidity (RH), a conventional commercial water heater firing at 120,000 Btu/hr and operating with 25% excess air will have an exhaust temperature of about 250° F. and will be about 83.5% efficient. Using the same parameters in a commercial water heater in accordance with one embodiment of the apparatus of this invention, conservative estimates show the system will be about 97.3% efficient with the characteristics as shown in FIG. 3.

The relevant properties of the flue gases derived from the upper section of the apparatus of this invention are shown at 1 in FIG. 3. Within the direct contact exhaust heat and condensate recovery section of the apparatus of this invention, (2), the flue gases are reduced to a temperature of about 90° F. and a relative humidity of about 30% and then vented, leaving behind about 0.2 pounds per minute of condensate at the condensing temperature. Within the lower section of the apparatus in which the combustion air is preheated and humidified (3), ambient air is brought in and preheated and humidified to saturated conditions at 120° F. The excess condensate is drained. Our modeling shows that combustion air humidified to that degree, with a water vapor-to-fuel mass ratio of approximately 4.3, will result in about a 90% reduction in $NO_x$ emissions.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. An apparatus for heating water comprising:
   a first section having an annular hot water storage tank encircling a first portion of a vertically oriented combustion chamber and having a tank top and a tank bottom, said vertically oriented combustion chamber in direct heat exchange communication with said annular hot water storage tank and having a combustibles inlet and a flue gas outlet, said flue gas outlet disposed below said tank bottom;
   a burner adapted to fire downward from said combustibles inlet into said combustion chamber;
   a second section disposed vertically below said hot water storage tank and encircling a second portion of the combustion chamber, having a flue gas inlet in a lower half of the second section corresponding to said fluid gas outlet of said combustion chamber and having a second section flue gas outlet;
   a third section vertically disposed below said second section having an ambient air inlet, a humidified air outlet in fluid communication with said combustion end of said combustion chamber, and a condensate outlet in fluid communication with said second section; and
   a passive condensate flow control device disposed between said second section and said third section having a condensate inlet side oriented toward said second section and a condensate outlet side oriented toward said third section.

2. The apparatus of claim 1, wherein a packing material is disposed in said second section, said packing material in fluid communication with said second section flue gas outlet.

3. The apparatus of claim 1, wherein a packing material is disposed in said third section in fluid communication with said ambient air inlet and said humidified air outlet.

4. The apparatus of claim 1, wherein said passive condensate flow control device is adapted to provide gravity-driven condensate flow between said second section and said third section.

5. The apparatus of claim 2, wherein said packing material is a material selected form the group consisting of plastics, ceramics, glass, glass-ceramics, non-corrosive metals, and combinations thereof.

6. The apparatus of claim 3, wherein said packing material is a material selected from the group consisting of plastics, ceramics, glass, glass-ceramics, non-corrosive metals, and combinations thereof.

7. An apparatus for heating water comprising:
at least one wall enclosing first, second and third vertically aligned water heating process sections;
said first section comprising an interior wall enclosing a longitudinal section of a vertically oriented combustion chamber having a combustibles inlet and a flue gas outlet and forming a water storage tank containing water between a portion of said at least one wall and a first portion of said interior wall;
said second section disposed vertically below said water storage tank and encircling a second portion of the interior wall, having a flue gas inlet in a lower half of the second section corresponding to said flue gas outlet of said combustion chamber and having a second section flue gas outlet;
said third section disposed vertically below said second section having an ambient air inlet, a humidified air outlet in fluid communication with said combustibles inlet of said combustion chamber, and a condensate outlet in fluid communication with said second section; and
a passive condensate flow control device disposed between said second section and said third section having a condensate inlet side oriented toward said second section and a condensate output side oriented toward said third section.

8. The apparatus of claim 7, wherein said combustion chamber is vertically oriented with said combustibles inlet disposed proximate a top side of said first section and said flue gas outlet disposed proximate a bottom side of said first section.

9. The apparatus of claim 8 further comprising a downward firing burner proximate said combustibles inlet of said combustion chamber.

10. The apparatus of claim 7, wherein a packing material is disposed within said second section arranged so as to receive flue gases exiting said second section flue gas outlet.

11. The apparatus of claim 7, wherein a packing material is disposed within said third section.

12. An apparatus for heating water comprising:
a first vessel comprising an interior wall forming a combustion chamber having a combustibles inlet and a flue gas outlet and an exterior wall spaced apart from said interior wall and forming an annular water storage tank between a first portion of said interior wall and said exterior wall;
a second vessel disposed vertically below said water storage tank and formed between a second portion of said interior wall and said exterior wall, having a flue gas inlet in a lower half of the second vessel in fluid communication with said flue gas outlet of said combustion chamber and having a second vessel flue gas outlet;
a third vessel disposed vertically below said second vessel having an ambient air inlet, a humidified air outlet in fluid communication with said combustibles inlet of said combustion chamber, and a condensate outlet in fluid communication with said second vessel; and
a passive condensate flow control device disposed between said second vessel and said third vessel having a condensate inlet side oriented toward said second vessel and a condensate output side oriented toward said third vessel, said passive condensate flow control device providing fluid communication between said second vessel and said third vessel while preventing an inflow of flue gases from said second vessel into said third.

13. The apparatus of claim 12, wherein said second vessel contains a packing material adapted to receive said flue gases from said flue gas inlet.

14. The apparatus of claim 12, wherein said third vessel contains a packing material adapted to receive ambient air from said ambient air inlet and condensate from said passive condensate flow control device.

15. An apparatus for heating water comprising:
an upper section, an intermediate section vertically disposed below a portion of said upper section and in fluid communication with said upper section, and lower section vertically disposed below said intermediate section and in fluid communication with said intermediate section;
said upper section comprising an annular hot water storage tank having a top end and a bottom end disposed around a first portion of a vertically oriented combustion chamber, the combustion chamber having a combustibles inlet proximate said top end of said storage tank and a flue gas outlet disposed in a lower half of said intermediate section;
a burner adapted to fire downward from said combustibles inlet and connected with a combustion chamber wall;
said intermediate section disposed around a second portion of the combustion chamber and having an intermediate section flue gas outlet;
said lower section having an ambient air inlet, a humidified air outlet in fluid communication with said combustibles inlet of said combustion chamber, and a condensate outlet in fluid communication with said intermediate section; and
a passive condensate flow control device disposed between said intermediate section and said lower section having a condensate inlet side oriented toward said intermediate section and a condensate outlet side oriented toward said lower section.

16. The apparatus of claim 15, wherein said intermediate section comprises a packing material in fluid communication with said flue gas outlet of said combustion chamber.

17. The apparatus of claim 16, wherein said lower section comprises an additional packing material in fluid communication with said ambient air inlet and said humidified air outlet.

18. The apparatus of claim 15, wherein said passive condensate flow control device is adapted to provide gravity-driven condensate flow from said intermediate section into said lower section.

19. The apparatus of claim 17, wherein said packing material is a material selected from the group consisting of plastics, ceramics, glass, glass-ceramics, non-corrosive metals, and combinations thereof.

* * * * *